Nov. 1, 1938.  W. C. BRADEN  2,135,274
VARIABLE SPEED TRANSMISSION
Filed Nov. 28, 1936   4 Sheets-Sheet 1

Fig.1.

INVENTOR:
William C. Braden
BY Kenyon Kenyon
ATTORNEYS.

Nov. 1, 1938.    W. C. BRADEN    2,135,274
VARIABLE SPEED TRANSMISSION
Filed Nov. 28, 1936    4 Sheets-Sheet 3

INVENTOR:
William C. Braden
BY Kenyon & Kenyon
ATTORNEYS.

Nov. 1, 1938.    W. C. BRADEN    2,135,274
VARIABLE SPEED TRANSMISSION
Filed Nov. 28, 1936    4 Sheets—Sheet 4

INVENTOR:
William C. Braden
BY
Kenyon & Kenyon
ATTORNEYS.

Patented Nov. 1, 1938

2,135,274

UNITED STATES PATENT OFFICE 2,135,274

VARIABLE SPEED TRANSMISSION

William C. Braden, Brooklyn, N. Y., assignor of one-half to Thomas S. Pates, Brooklyn, N. Y.

Application November 28, 1936, Serial No. 113,129

29 Claims. (Cl. 74—114)

This invention relates to a variable speed transmission adapted for use between a driving and a driven shaft, more especially where the latter is subject to a heavy starting load or to wide variations in load at different speeds.

One of the advantages of a transmission according to this invention lies in the provision of means whereby power may be transmitted from the driving to the driven shaft through a speed reduction mechanism which is purely mechanical in its elements and is capable of accommodating itself to an infinite number of speed ratios, from a ratio at which the driving shaft may rotate at substantially any speed up to its maximum speed while power is transmitted to a stationary (or starting) driven shaft to a ratio in which the driving and driven shafts rotate at the same speed.

A further advantage of this invention lies in the provision of means whereby, while the driving shaft is rotating at a speed equivalent to that of an idling motor, no power is transmitted to the driven shaft, but upon increase of the speed of rotation of the driving shaft above that speed power is automatically transmitted to the driven shaft through a variable speed reduction apparatus whose ratio (of speed of driving to driven shafts) automatically decreases as the speed of the driving shaft increases until, when the driven shaft has reached a predetermined speed of rotation, the speed reduction apparatus is automatically cut out and the driving and driven shafts are brought into direct connection for rotation at the same speed.

A further advantage of this invention lies in the fact that manual means are provided whereby the predetermined speed of the driven shaft, referred to in the previous paragraph, at which the speed reduction apparatus is automatically cut out and direct connection is established, may be increased at will during operation of the device so as to extend upwardly the range of speeds of the driven shaft within which the driving and driven shafts are connected together through the speed reduction apparatus. This feature of the invention is particularly useful in case of the application of this transmission to an automobile, when it is desired to keep the car in "low speed" during acceleration to a speed higher than that at which normally the shift would be made to "high speed"—for example, when accelerating on a long hill.

A further advantage of this invention lies in the provision of means responsive to increase of load upon the driven shaft, and effective upon the speed reduction apparatus, to increase the ratio of speed reduction at any particular speed of the driven shaft. This feature is particularly useful when the transmission of this invention is applied to an automobile, because it provides for automatic increase of the ratio of the speed reduction apparatus when increase of load on the driven shaft calls for an increased effort from the motor, and permits the motor to speed up immediately when this demand is put upon it and substantially without change in the then existing speed of rotation of the driven shaft, and without the necessity of awaiting a decrease in the speed of rotation of the driven shaft before an increase of engine speed can become effective to produce more power.

A further advantage of this invention lies in the provision of means whereby, when the speed reduction apparatus is operatively connected with a driven shaft at rest and arranged to start and drive the same in one direction of rotation when power is transmitted through it, the driven shaft is secured against rotation in the opposite direction while it remains at rest and such operative connection is maintained. This feature is particularly useful when the transmission of this invention is applied to an automobile for, while the speed reduction apparatus is connected for forward movement to an automobile propeller shaft at rest, the propeller shaft is secured against backward rotation, and vice versa. Thus the car is secured against rolling backward and ease of starting on a hill is greatly facilitated, for the transmission itself includes what serves in effect as braking means to prevent roll-back thus making it unnecessary for the car operator to use the car brakes to hold the car while he is applying power.

Briefly, in the form here shown, this transmission comprises a variable speed reduction apparatus consisting of rocker shafts and one-way clutches with a drive for the rocker shafts consisting of an eccentric whose eccentricity is variable under the control of centrifugal means here described. One of the features of this invention comprises the means by which this speed reduction apparatus is automatically interposed to establish driving connection therethrough between the driving and the driven shafts, depending either upon the speed of rotation of the driven shaft, or upon manually selective means, or both. Another feature comprises means whereby the automatic means establishing the upper limit of speed of the driven shaft at which this speed reduction apparatus is cut out may be modified in its operation by manually selective means to raise said upper limit when required. Another feature, relating more particularly to the speed reduction apparatus itself and effective when it is in operation, comprises means automatically responsive to an increase of load on the driven shaft to increase the ratio of speed reduction in the speed reduction apparatus; in the particular form here shown this takes the form of means to modify the action of the centrifugal means referred to, so as to decrease the eccentricity of the variable eccentric and thus increase the torque applied to the driven shaft to overcome the added load.

Within the scope of this invention the form of apparatus here shown and described is susceptible of wide variation. For example, the particular form of variable speed reduction apparatus here shown may be replaced with other known forms of variable speed reduction means; and the means for control of the same and for cutting the same in and out may take different forms to accomplish the functions or purposes here described and claimed.

Referring to the annexed drawings.

The transmission herein described is adapted to be secured to the casing 10 associated with the usual flywheel 11 secured upon motor shaft 12 of any type of internal combustion engine. To connect the transmission here disclosed to such flywheel and casing it is only necessary to remove that portion of the flywheel casing which, in the standard motor unit, is secured to the casing 10 by bolts in flanges 13 and to connect the transmission here disclosed to the same flanges 13 with appropriate connections to the flywheel hereinafter set forth.

Figure 1:
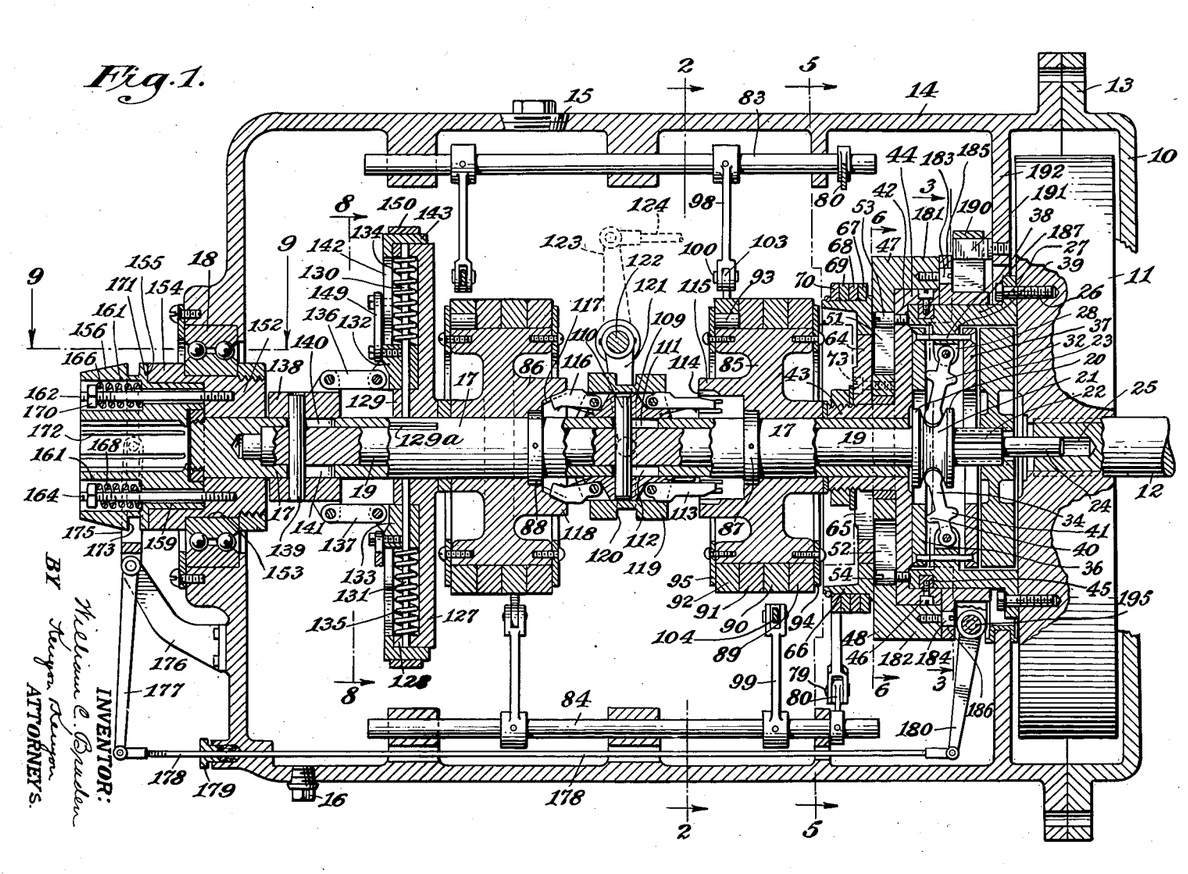
Figure 1 is a vertical section through the central axis of the transmission, certain parts of the shafts 17 and 19 and flywheel 11 being shown in elevation.

Within a casing 14 having an oil inlet 15 and an oil drain 16, and longitudinally thereof, are provided two nested shafts. Main shaft 17 is rotatably mounted in a bearing 18 at the rear end casing and supported at its forward end by the flywheel 11 through means hereinafter described. Shaft 17 is axially drilled to receive floating shaft 19 which is free to slide lengthwise of shaft 17 along a path of predetermined length but is secured for rotation with shaft 17 by means hereinafter set forth. Shaft 19, at its forward end, and forwardly of the end of shaft 17, is provided with two annular flanges 20 defining between them an annular channel 21 serving as a guideway for the ends of lugs hereinafter described. Adjacent the annular channel 21 and annular flanges 20 shaft 19 is provided with splines 22 adapted to engage the splined inner periphery of friction wheel 23 hereafter described. The end 24 of shaft 19 is reduced and enters drilled opening 25 within motor shaft 12, where it is free to rotate independently of motor shaft 12 and to move lengthwise thereof within a limited path of movement. The engagement of reduced end 24 with opening 25 serves as a pilot bearing for the forward end of the transmission members hereafter described.

Secured to the face of flywheel 11 by bolts 26 is an annular driving member 27 having four inwardly turned lugs 28, 29, 30 and 31. Pivotally secured to each of said lugs respectively is a finger 32, 33, 34 and 35 whose opposite end trails within the annular channel 21. The arrangement is such that as shaft 19 moves lengthwise, fingers 32, 33, 34 and 35 are rocked about their respective pivotal mountings adjacent the inner periphery of annular driving member 27 for a purpose hereinafter set forth.

Figures 3, 4:
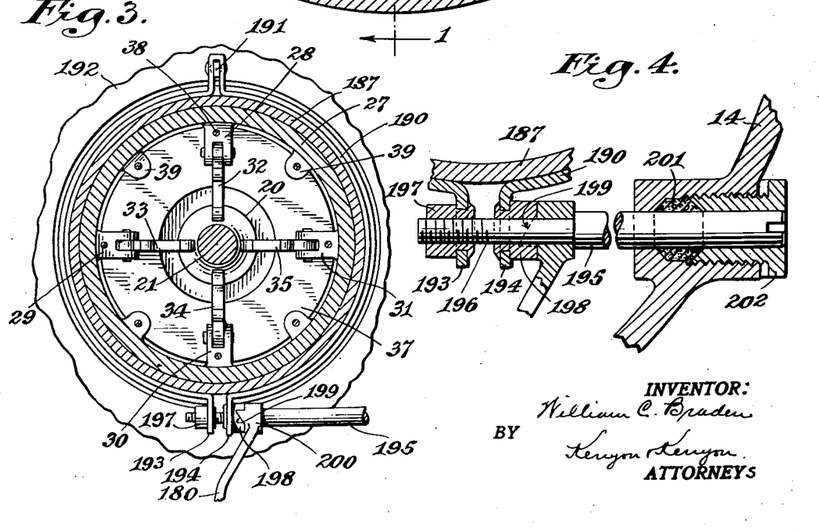
Figure 3 is a vertical section on the line 3, 3 of Figure 1.
Figure 4 is a vertical section of the parts associated with shaft 195 which are seen in elevation at the bottom of Figure 3.

Within annular driving member 27, and secured for rotation therewith, are two friction discs 36 and 37 secured together by pins 38. Pins 38 (see Fig. 3) are several in number and pass through openings in lugs 28, 29, 30 and 31 respectively. Optionally there may be additional lugs 39 providing openings for additional pins 38 securing together the friction discs 36 and 37 at intermediate points around their periphery. The arrangement is such that friction discs 36 and 37 are secured together a fixed distance apart and, moving together as a unit, are adapted to move axially of annular driving member 27, for a purpose described below, and to rotate with annular driving member 27 and therefore with flywheel 11.

Fingers 32, 33, 34 and 35 are provided at each of their lateral edges with protuberances 40, 41 adapted to engage, respectively, friction disc 36 and friction disc 37. The arrangement is such that as fingers 32, 33, 34 and 35 are rocked about their respective pivots the protuberances 40 and 41 of each engage one or the other of friction discs 36 and 37, and thus move said discs axially forward or backward for a purpose hereinafter set forth.

Upon the end of shaft 17, and free to rotate thereon, is mounted friction plate 42 provided with a boss 43 engaging said shaft 17 and having an annular rim 44 engaging the outer periphery of annular driving member 27 but free to rotate independently thereof. Slip ring 45 fitting within a channel in the outer periphery of annular driving member 27, but free to slip therein, is secured to annular rim 44 by screws 46. The arrangement is such that friction plate 42 and annular driving member 27 are secured against lengthwise displacement by the slip ring 45, but are free for relative rotation. Friction disc 36 is adapted, when moved backwardly by fingers 32, 33, 34 and 35, to make frictional engagement with one face of friction plate 42 thereby bringing the motor into driving connection with the driven shaft through the speed reduction apparatus hereinafter described.

Upon the splined portion 22 of floating shaft 19 is mounted a friction wheel 23 internally splined at its hub to engage splines 22, and adapted to rotate with floating shaft 19 and to move lengthwise thereof within a limited path of movement. At one end of this path of movement friction wheel 23 is adapted to make frictional engagement with the face of flywheel 11. The arrangement is such that friction disc 37 is adapted, when moved forwardly by fingers 32, 33, 34 and 35, to engage friction wheel 23 and to move the latter into frictional engagement with the face of flywheel 11, in another position of the apparatus, thereby bringing the motor into direct driving connection with the driven shaft.

Figures 5, 6, 7:
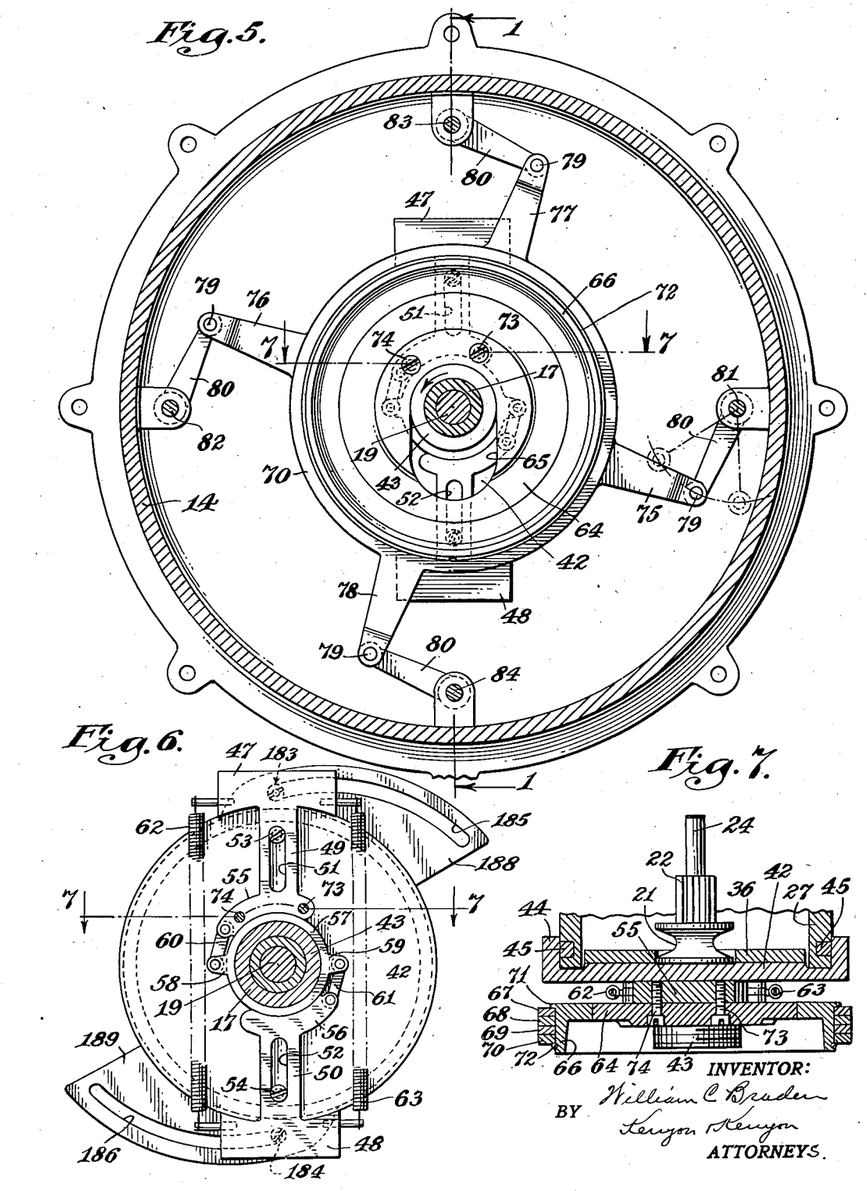
Figure 5 is a vertical section on the line 5, 5 of Figure 1.
Figure 6 is a vertical section on the line 6, 6 of Figure 1.
Figure 7 is a horizontal section on the line 7, 7 of Figures 5 and 6.

Secured to friction plate 42 are weights 47 and 48 (see Fig. 6) formed with inwardly projecting arms 49 and 50. Said arms 49 and 50 are provided with radial slots 51 and 52. The heads of bolts 53 and 54, secured in friction plate 42, extend into slots 51 and 52 and serve in part as guides for the weights 47 and 48 when the latter move outwardly under the influence of centrifugal force. Other suitable guides (not shown) may be provided, preferably secured to friction plate 42, so that weights 47 and 48 may be free to move radially with respect to the axial center of friction plate 42 within a path defined by the length of slots 51 and 52. Arms 49 and 50 are provided at their inner ends with shoes 55 and 56 curved to seat, when the weights are at their inward position, upon collar 57 rotatably secured upon the boss 43. Collar 57 is provided, at diametrically opposite points with two extending lugs 58 and 59 integral therewith. Links 60 and 61 are pivotally secured respectively to shoes 55 and 56, and to lugs 58 and 59. The arrangement is such that upon outward movement of the weights 47 and 48, collar 57 is rotated in a clockwise direction as seen in Fig. 6, and through collar 57 the centrifugal force of the weights is equalized and made available for a purpose hereafter set forth.

Springs 62 and 63 are secured respectively to weights 47 and 48 and are so arranged as to provide resilient opposition to outward movement of the weights under the influence of centrifugal force.

By the means described above, weights 47 and 48, together with their associated mechanism (best seen in Fig. 6) rotate with friction plate 42. Upon increase of speed of rotation of friction plate 42, centrifugal force tends to move weights 47 and 48 outwardly, a movement which is resiliently opposed by the springs 62, 63. The purpose of said outward movement of the weights 47, 48 is to increase the eccentricity of the speed reduction apparatus which will now be described.

Mounted upon boss 43 and secured for rotation therewith (see Fig. 5) is a variable eccentric 64 having a slot 65 engaging the boss 43 and adapted to permit eccentric 64 to move in a direction perpendicular to the axis of boss 43 and thus to move from a position concentric with boss 43 (and with shafts 17 and 19) to a position eccentric with respect to the axis thereof, the amount of eccentricity being determined by the length of slot 65. Upon the periphery of eccentric 64 is secured a circular shoe 66 having an outer surface upon which (see Figs. 1 and 7) four bands 67, 68, 69 and 70 are adapted to ride. These bands are arranged to ride upon the surface of shoe 66 as the latter rotates, and to furnish the means by which reciprocating power is derived from shoe 66 and variable eccentric 64 when the latter have been moved to eccentric position relative to the axis of the central shafts, in a manner hereinafter described. Bands 67, 68, 69 and 70 are secured upon the rim of shoe 66 in any suitable manner, as by an upstanding flange 71 and ring 72.

Variable eccentric 64 and shoe 55, associated with weights 47 and 48, are secured together (see Figs. 6 and 7) by bolts 73 and 74 whereby outward movement of the weights 47 and 48 under the influence of centrifugal force, transmitted to shoe 55, moves eccentric 64 from its position concentric to the axis of boss 43 to a position of eccentricity with respect thereto, the amount of such eccentricity depending upon the extent of the outward movement of weights 47 and 48 against the resilient opposition of springs 62 and 63. Accordingly, when power from the motor is transmitted through annular driving member 27 and friction disc 36 to friction plate 42, the position of weights 47 and 48 depends upon the speed of the motor, and the mass of the weights and the tension of the springs is such, in the form of the invention here disclosed, that when the motor is rotating at what may be called "idling speed" (say 250 R. P. M.), the strength of springs 62 and 63 will be sufficient to retain weights 47 and 48 at their inward position as shown in Fig. 6, and accordingly to secure variable eccentric 64 in its position of concentricity with respect to boss 43 and shafts 17 and 19, but when the speed of rotation of the engine is increased above this speed the relationship between the mass of weights 47 and 48 and the strength of springs 62 and 63 is so arranged as to permit weights 47 and 48 to move outwardly under the influence of centrifugal force until at a desired engine speed they have reached the most outward position permitted by the engagement of pins 53 and 54 with slots 51 and 52. At the latter position the eccentricity of the variable eccentric 64 is at its maximum.

Formed integral with each of bands 67, 68, 69 and 70, is, respectively, a projecting arm 75, 76, 77 and 78 (see Fig. 5). The end of each of these arms is divided to provide a pivot pin 79 to which is pivotally secured lever 80 secured respectively to each of four rocker shafts 81, 82, 83 and 84 suitably journaled adjacent the casing 14. The arrangement is such that each of arms 75, 76, 77 and 78 is associated respectively with rocker shafts 81, 82, 83 and 84. When eccentric 64 is in a position of concentricity with respect to the central shafts, no motion is transmitted to the rocker shafts, but when under the influence of weights 47 and 48 eccentric 64 is moved to a position more or less eccentric with respect to the central shafts, bands 67, 68, 69 and 70 will ride upon the surface of shoe 66 and be carried about in a circular path. Bands 67, 68, 69 and 70 are prevented from rotating by the connection of their respective arms 75, 76, 77 and 78 with the levers of the rocker shafts to which they are respectively secured. Accordingly, as eccentric 64 rotates in a path which is more or less eccentric with respect to the central shafts the levers 80 will be moved back and forth through an arc whose length depends upon the extent of the eccentricity of the variable eccentric 64. By the means disclosed the rotating power derived from the engine is converted into oscillatory rotation of the rocker shaft 81, 82, 83 and 84. By varying the eccentricity of eccentric 64 the speed ratio between driving and driven shafts may be varied, and this eccentricity, as described above, is under the control of weights 47 and 48.

Mounted upon shaft 17, but free for rotation with respect thereto, are drums 85 and 86 (see Fig. 1). Said drums 85 and 86 are secured against longitudinal movement with respect to shaft 17 by rings 87 and 88 secured upon shaft 17 in any suitable manner and fitting within recesses in the inner periphery of drums 85 and 86.

Figure 2:
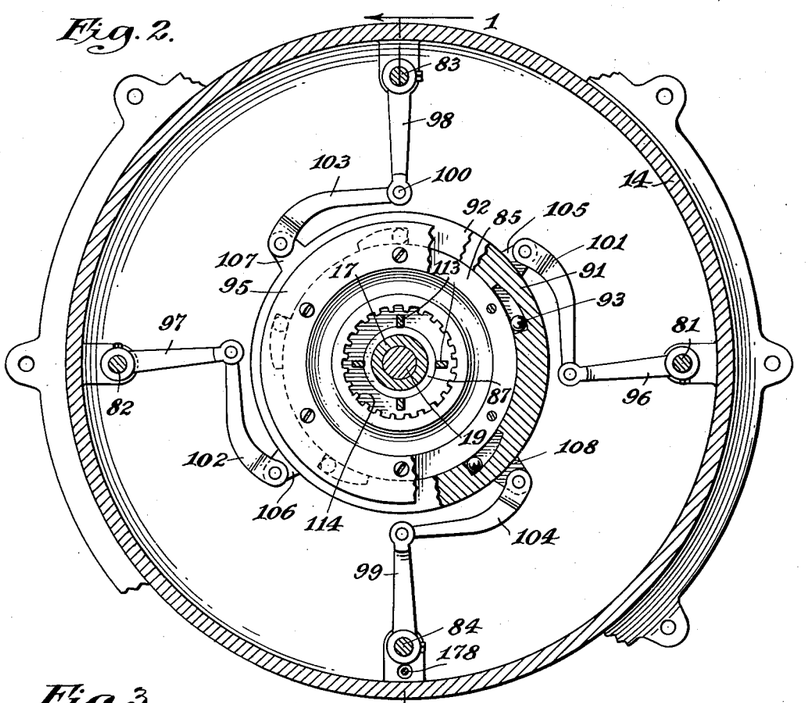
Figure 2 is a vertical section on the line 2, 2 of Figure 1.

Upon the smooth outer periphery of drum 85 are mounted four oscillating one-way clutches 89, 90, 91 and 92 having roller pawls 93 (see Fig. 2) which engages the smooth outer periphery of drum 85 when said clutches are rotated in one direction and which run free when said clutches are rotated in the other direction. However, it will be understood that any other suitable one-way clutch may be used in the combination here disclosed and claimed. The four clutches 89, 90, 91 and 92 are secured upon the surface of drum 85 by suitable annular end plates 94 and 95.

Drum 86 is similarly provided with four oscillating one-way clutches having roller pawls secured in place by end plates, the arrangement being the same as with respect to drum 85, and therefore the description is not here repeated, except that the clutches face in the opposite direction.

Levers 96, 97, 98 and 99 (see Fig. 2) are secured respectively to each of rocker shafts 81, 82, 83 and 84 and are adapted to swing about the axis of said rocker shafts as a center as said rocker shafts oscillate. Each of levers 96, 97, 98 and 99 is provided at its outward end with a pivot pin 100 furnishing pivotal connection for links 101, 102, 103 and 104, respectively. Said links, in turn, are pivotally connected to arms 105, 106, 107 and 108 formed integral with clutches 91, 89, 92 and 90 respectively. The arrangement is such that oscillatory motion of the rocker shafts 81, 82, 83 and 84 will be transmitted through the several levers and arms mentioned to the four clutches respectively, and will cause said clutches to oscillate within a short arc of rotation upon the outer periphery of drum 85. The roller pawls are faced in such a direction that each of their oscillations in one direction will transmit rotative power to drum 85 and in the other direction will rotate free of drum 85.

The several clutches associated with drum 86 are similarly connected through similar linkage with the rocker shafts 81, 82, 83 and 84, and because of the similarity the description need not be here repeated. There is, however, this difference in the two groups of clutches: the clutches associated with drum 85 have their roller pawls facing in one direction; those associated with the drum 86 have their roller pawls facing in the opposite direction. Accordingly, drum 85 is caused to rotate in one direction, and drum 86 is caused to rotate in the opposite direction. In the form of transmission here shown it is intended that drum 85 shall be used for "reverse" drive, and drum 86 shall be used for "forward" drive. It will be noted that both of drums 85 and 86 are free to rotate upon shaft 17.

For convenience in disclosure, there has been described above a transmission including four bands 67, 68, 69 and 70, four rocker shafts 81, 82, 83 and 84, four clutches 89, 90, 91 and 92 on the reverse drum 85 and four similar clutches on the forward drum 86. It will be understood, however, that the number of such interconnected series of bands, rocker shafts and clutches may be either more or less than four as here shown. Where required, for example, five or six or more of such series may be employed as, for example, where the amount of power to be transmitted is large.

The means for bringing either of drums 85 or 86 into driving connection with shaft 17 will now be described. Upon shaft 17, and positioned between drums 85 and 86 is ring 109, secured for rotation with shaft 17 by pin 110 passing through ring 109, through slots 111, 112 in the walls of shaft 17 and through a hole bored diametrically through floating shaft 19. The arrangement is such that ring 109 and floating shaft 19 are secured together both for rotation and longitudinal movement, and both are adapted to slide longitudinally of shaft 17 to the extent permitted by the length of slots 111, 112 through which pin 110 passes.

Pivotally secured to ring 109 are a series of pawls 113 adapted to engage splines 114 formed upon the inner periphery of an extending annular portion 115 of drum 85. Pawls 113 are secured upon their respective pivots, and are provided in sufficient numbers around the periphery of ring 109, to serve as the connecting link through which power may be transmitted from drum 85 to ring 109 (and thus to shaft 17) when pawls 113 are brought into engagement with splines 114 by means hereinafter described.

A second series of pawls 116 are pivotally secured to ring 109 at the opposite end thereof and are adapted to engage splines 117 formed upon the inner periphery of annular portion 118 of drum 86. As these pawls are in many respects similar to the pawls 113, the detailed description will not be repeated here. The arrangement is such that when pawls 116 engage splines 117, drum 86 and ring 109 are secured for rotation together and thus power delivered to drum 86 may be transmitted through ring 109 to shaft 17.

Upon ring 109 is mounted control ring 119 provided on its outer periphery with a groove 120. Control ring 119 is adapted to slide longitudinally with respect to ring 109 under manual control. This manual control may comprise any suitable means, for example, yoke 121 secured to shaft 122 leading out through the casing 14 and connected by lever 123 and rod 124 to a suitable hand lever.

Referring more particularly to Figs. 11, 12, 13 and 14, pawls 116 are provided with upwardly extending cam surfaces 125, and pawls 113 provided with upwardly extending cam surfaces 126. Each of said pawls 113 and 116 is provided with a suitable spring 127b, 128b urging said pawl outwardly from the axial center of the shaft and at certain times effective to bring about engagement between said pawls and their respective cooperating splines. Control ring 119 is adapted to engage either or both of said cam surfaces 125 and 126, and thus to depress either or both of the series of pawls 113 and 116.

Figure 11:
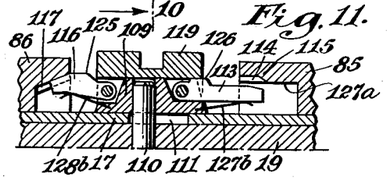
Figure 11 shows control ring 119 and associated parts in their "low speed forward" position.
Figure 12:
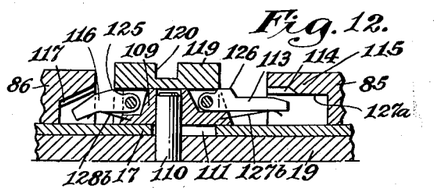
Figure 12 shows the same parts in "neutral" position.
Figure 13:
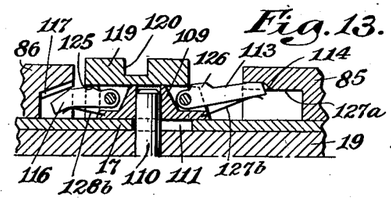
Figure 13 shows the same parts in "reverse" position.
Figure 14:
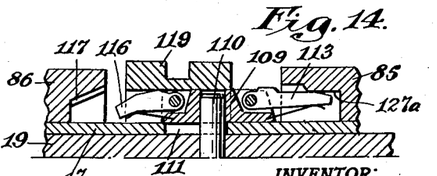
Figure 14 shows the same parts in "high speed forward" position.

The arrangement is such that when the ring 109 is in its rearward position (as seen in Figs. 11, 12 and 13)—the position, as hereinafter set forth, which it assumes when the speed of rotation of the driven shaft is less than a predetermined speed—pawls 116 will be in a position to engage splines 117 under the influence of springs 128b unless prevented from so doing by engagement of control ring 119 with cam surfaces 125. When control ring 119 is in its extreme forward position (Fig. 11) it is out of engagement with cam surfaces 125 but it is engagement with cam surfaces 126. Accordingly pawls 116 move outwardly under the influence of springs 128b and make engagement with splines 117, thereby establishing a driving connection between drum 86 and ring 109. At this position pawls 113 are depressed by engagement of control ring 119 with cam surfaces 126 and are out of engagement with splines 114. It will be remembered that drum 86 transmits forward power on a speed reduction basis. Accordingly in the position of the parts here described, and shown in Fig. 11, the apparatus is adapted to transmit forward power to the driven shaft through the speed reduction apparatus.

When control ring 119 is moved rearwardly to its center position (Fig. 12) it is adapted to engage both with cam surfaces 125 and cam surfaces 126, thereby depressing both the pawls 113 and 116. Accordingly, in this position, there is no engagement between the pawls of either series with their cooperating splines and no operative connection remains between either of drums 85 or 86 and shaft 17. Accordingly, the position here described and shown in Fig. 12 may be described as the "neutral" position of the apparatus.

When control ring 119 is moved to its extreme rearward position (Fig. 13) it is adapted to be out of engagement with cam surfaces 126 and to remain in engagement with cam surface 125, thereby permitting pawls 113 to move outwardly under the influence of springs 127b. Accordingly pawls 113 are adapted to engage splines 114 associated with drum 85, and thereby to establish a driving connection between drum 85 and shaft 17. As drum 85, because of the facing of its one-way roller clutches, operates in the opposite direction from drum 86, the arrangement here described, and shown in Fig. 13, is adapted to transmit reverse rotation from the engine to the driven shaft through the speed rotation apparatus.

When the speed of rotation of the driven shaft has increased above a predetermined speed, the floating shaft 19 is moved forwardly, by means hereinafter described. When this has happened the parts here described assume the position shown in Fig. 14. At this time pin 110 has moved to the forward end of slot 111 and accordingly ring 109 has been moved forwardly upon shaft 17 by an equal amount. In this position the ends of pawls 113 are moved beyond the ends of splines 114 and engage the smooth inner periphery 127a of annular portion 115 of the drum 85 where they are free to rotate and no operative connection is established between drum 85 and shafts 17 and 19. At the stage here described, and shown in Fig. 14, power is transmitted from the engine to the driven shaft through the direct frictional engagement of friction wheel 23 with flywheel 11 (see Fig. 1), and no power is transmitted to shaft 17 through the speed reduction apparatus. Accordingly, at this stage, there is "direct drive" between the engine and the driven shaft.

By the apparatus described an effective means is provided to prevent the car from rolling backward when the speed reduction apparatus is connected through forward drum 86 to the driven shaft, i. e., when the control parts are in the position shown in Figs. 1 or 11, the driven shaft is at rest and the engine shaft 12 is rotating at idling speed. If, at this time, there should be a tendency for the car to roll backward, the tendency of shaft 17 to rotate backward will be checked by engagement of roller pawls 93 with their respective slots in the one-way clutches. The latter are held against rotation by the rocker shafts which, at this time, are stationary because of the concentricity of bands 67, 68, 69 and 70 with the central axis of the transmission. Thus, until the engine shaft 12 is speeded up above idling speed, the driven shaft is secured against backward rotation. Similarly, when the speed reduction apparatus is connected to the driven shaft through reverse drum 85, the driven shaft is secured against forward rotation till the engine shaft is speeded up and power is transmitted.

The means by which floating shaft 19 is automatically moved within shaft 17 will now be described. Secured upon shaft 17 by key 129a, rearwardly of drum 86, is a disc 127, adapted to rotate with shaft 17. Disc 127 is provided at its periphery with a rim 128 and adjacent its center with hub 129. Axial rods 130, 131 are secured extending between hub 129 and rim 128. Slidably mounted upon said rod are two weights 132 and 133. Springs 134 and 135 are interposed between weights 132 and 133 respectively and the rim 128. The arrangement is such that, as disc 127 rotates, weights 132 and 133 tend to slide outwardly upon rods 130 and 131, and are resiliently opposed in this motion by the compression of springs 134 and 135.

Weights 132 and 133 are respectively pivotally connected to links 136 and 137 which, in turn, are pivotally connected to collar 138 mounted upon and rotating with, but free to slide longitudinally of, shaft 17. Pin 139 passes through collar 138 from side to side, penetrating slots 140, 141 in shaft 17 and also penetrating a diametrical bore crosswise through the center of floating shaft 19. The arrangement is such that as shaft 17 increases its speed of rotation, weights 132, 133 tend to move outwardly under the influence of centrifugal force and upon such movement, through links 136, 137, to slide ring 138 forwardly along shaft 17. As collar 138 slides forwardly along shaft 17, it moves floating shaft 19 with it, the extent of movement being limited by the length of slots 140, 141 within which pin 139 moves. The arrangement of the mass of weights 132, 133 and the strength of springs 134, 135 is such that the weights will be maintained at their inward position during all speeds of rotation of the disc 127 (which rotates with the driven shaft) up to a speed equivalent to that at which it is normally desirable to cut out the speed reduction apparatus and establish a direct driving connection between the engine shaft and the driven shaft, but such as to permit, when this speed is reached or exceeded, the weights 132, 133 to move outwardly under the influence of centrifugal force unless such movement is checked as hereinafter described. If this transmission is applied to an automobile the speed referred to will normally be in the neighborhood of, say, 18 m. p. h.

The manual means by which the action of weights 132, 133 may be modified will now be described. Mounted upon disc 127 (see Fig. 8), is a cutaway disc 142 having an annular rim 143 engaged upon rim 128 of disc 127. Bolts 144 screw-threadedly secured to disc 127 pass through slots 145 in cutaway plate 142. Bolts 144 are provided with nuts 146 and washers 147 with intermediate resilient means such as a spring 148 to furnish yielding engagement between washer 147 and cutaway plate 142. The arrangement is such that cutaway plate 142 may rotate relative to disc 127 through a few degrees of arc under the influence of selective control means described below, but except as stated rotates with disc 127 and therefore with shaft 17.

Links 149 are pivotally secured respectively to weights 132 and 133, and, at their opposite ends, are pivotally secured to cutaway plate 142, the angular relation being such (best seen in Fig. 8) that as weights 132, 133 move outwardly under the influence of centrifugal force cutaway plate 142 is caused to rotate relative to disc 127 through a few degrees of arc, as permitted by the engagement of bolts 144 with slots 145.

Figures 8, 9, 10:
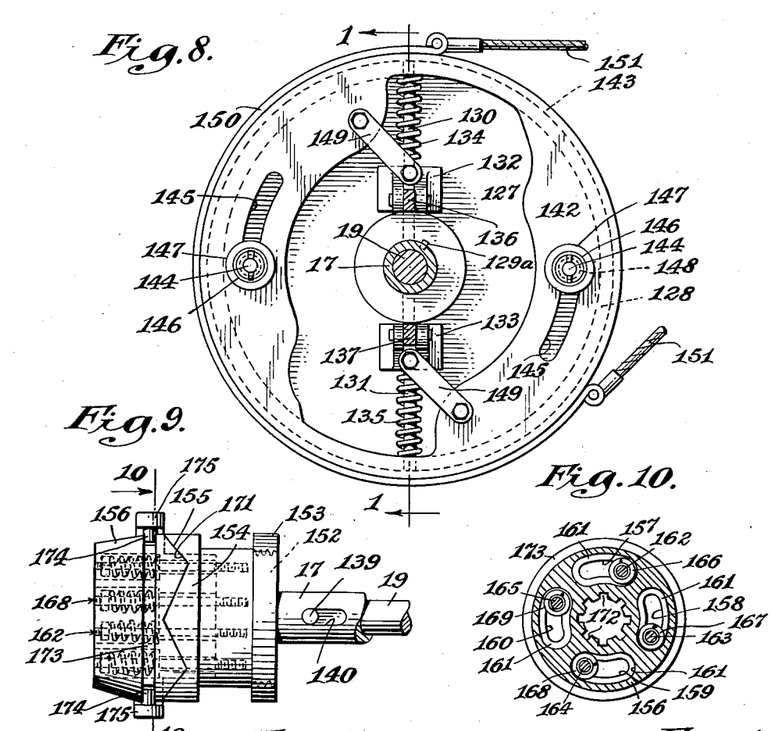
Figure 8 is a vertical section on the line 8, 8 of Figure 1.
Figure 9 is a horizontal section, with the bearing 18 removed, on the line 9, 9 of Figure 1.
Figure 10 is a vertical section on the line 10, 10 of Figure 9.

Mounted upon the outer periphery of rim 143 of cutaway plate 142 is a brake band 150 provided with manual control means 151 for tightening it at will upon the outer periphery of rim 143. The arrangement is such that as the shaft 17 and disc 127 rotate in a direction corresponding to forward movement of the car counter-clockwise as seen in Fig. 8), and the weights 132, 133 tend to overcome the resistance of springs 134, 135 and are about to begin to move outwardly (thereby shifting from "speed reduction" to "direct" drive), tightening of brake band 150 will tend to prevent the clockwise rotation of cutaway plate 142 relative to disc 127 which such outward movement of the weights would produce, and accordingly the weights may be selectively retained at their inner position while the speed of the driven shaft increases. In this way it is possible, according to this invention, to delay the shaft from "speed reduction" to "direct" drive until the speed of the driven shaft has increased above the predetermined speed at which, ordinarily, such shift would be automatically effective.

The means will now be described whereby increase of load upon the driven shaft will be automatically effective to change the ratio within the speed reduction apparatus and to increase the same so that, if the load on the driven shaft should increase, the eccentricity of the variable eccentric 64 will be increased automatically tending to increase the ratio of the engine shaft to the driven shaft in order that a greater torque may be transmitted to the driven shaft immediately, and without waiting for a reduction in the speed of rotation of the driven shaft.

To the rearward end of shaft 17 (see Figs. 1, 9 and 10), is secured collar 152 for rotation therewith. Collar 152 is provided with a recess 153 in its outer periphery for engagement with the bearing 18 secured to casing 14. Collar 152 is provided with a rearwardly projecting annular rim 154 having its end face formed in a series of angular faces 155. Partly within annular rim 154 is positioned a torque reaction member 156 provided with four longitudinal arcuate slots 157, 158, 159 and 160. Said slots pass entirely through torque reaction member 156, but at approximately their mid-point are reduced in size to provide spring seats 161. Bolts 162, 163, 164 and 165 threadedly engage collar 152 and extend through said slots 157, 158, 159 and 160 respectively. Coil springs 166, 167, 168 and 169 are arranged around each of these bolts respectively, are seated upon spring seats 161, and are secured in place and under substantially heavy compression by nuts 170. Torque reaction member 156 is provided with a shoulder having an angularly formed face 171 corresponding to and matching the angularly formed end faces 155 when the parts are in their normal position as shown in Fig. 9.

Torque reaction member 156 has internal splines 172 for the attachment of a shaft to be driven (not shown). Torque reaction member 156 is adapted at all times to rotate with the shaft to be driven but is arranged to slide lengthwise thereof under certain conditions. The cooperating faces 155 and 171 are so arranged that normally, and under ordinary operating conditions, the torque reaction member is maintained in seated engagement with annular rim 154 of collar 152, but in the event of any sudden increase of torque, or of any unusual strain tending to cause collar 152 and torque reaction member 156 to rotate relative to each other in either direction, such rotation will cause one of angularly formed faces 155 and 171 to slide upon the other resulting in movement of torque reaction member 156 away from collar 152. Such movement is opposed by the compression of springs 166, 167, 168 and 169, tending to return the torque reaction member to its original position. As the force producing this separation diminishes, torque reaction member 156 will be returned to its original position in seating engagement with annular rim 154. Thus, any undue strain or extra load upon the driven shaft, or the application of a sudden starting torque upon a driven shaft at rest under load, will cause a rearward movement of torque reaction member 156. This rearward movement is utilized, in the present invention, to change the speed reduction ratio in order to enable the motor to operate at higher speed and thus produce more power to overcome the resistance of the load, in the manner and by the means which will now be explained.

Upon the outer periphery of torque reaction member 156 is a circular channel 173. Engaged therewith are the fingers 174 of a yoke 175 pivotally mounted on a fixed bracket 176 and secured to a downwardly extending lever 177. To the end of lever 177 is pivotally secured a push rod 178 which enters casing 14 through a suitable packing 179 and extends to the front end of casing 14 where it is pivotally secured to lever 180.

The means will now be described whereby the eccentricity of variable eccentric 64 may be decreased as a result of rearward movement of the torque reaction member 156.

Weights 47 and 48 have forwardly projecting portions 181 and 182, respectively. In the forward face of each of said portions 181 and 182 is threadedly secured a bolt, said bolts having projecting heads 183, 184. These heads engage respectively in slots 185 and 186 of the reaction ring 187 now to be described.

Mounted upon annular driving member 27, and free for relative rotation with respect thereto, is a reaction ring 187 having two outwardly projecting wings 188 and 189 (see Fig. 6). Wings 188 and 189 contain slots 185 and 186 respectively, said slots being formed along the arm of an outward spiral with respect to the central axis of the transmission. The arrangement is such that as weights 47 and 48 move outwardly under the influence of centrifugal force, bolt heads 183 and 184, engaging in slots 185 and 186 respectively, will, by reason of the spiral shape of said slots, cause reaction ring 187 to rotate relative to the position of the weights. For example, as seen in Fig. 6, outward movement of the weights will cause the wings 188, 189 of reaction ring 187 to rotate in a counterclockwise direction relative to the position of the weights.

Upon the smooth outer periphery of reaction ring 187 is positioned a brake band 190 (see Figs. 3 and 4) supported at its upper end upon stud 191 which is screw-threadedly secured in diaphragm 192 forming a part of casing 14. The opposing ends of brake band 190, at the bottom of the casing, are turned downwardly, to provide opposing ends 193, 194. A shaft 195 is provided with a reduced end portion 196 extending through holes in the ends 193, 194 and is provided on its projecting end with a nut 197 in screw-threaded engagement therewith. Secured to end 194 is cam washer 198 providing a sloping cam surface 199. Lever 180 is provided with a boss 200 secured to shaft 195 and provided with a projection engaging cam surface 199. The opposite end of shaft 195 passes through a suitable packing 201 in the wall of the casing 14 and is provided on its outer end with an adjusting nut 202 arranged to permit adjustment of the tension on brake band 190.

The arrangement is such that movement of lever 180 tending to tighten brake band 190 retards the rotation of reaction ring 187 and causes it to move in a clockwise direction relative to the position of weights 47, 48, as seen in Fig. 6. Because of the angular relation between spiral slots 185, 186 and bolt heads 183, 184, such rotation of reaction ring 187 will cause weights 47 and 48 to move inwardly against centrifugal force. As already explained, inward movement of these weights decreases the eccentricity of the variable eccentric 64 and thereby increases the ratio of the speed reduction apparatus.

Accordingly, by the means described, an increase of load upon the driven shaft, or a sudden application of power thereto while the driven shaft is at rest under load, will cause the torque reaction member 156 to move rearwardly, and through the linkage described will tighten brake band 190 thereby moving weights 47 and 48 inwardly and decreasing the eccentricity of the variable eccentric 64. By this means, when sudden load is imposed upon the engine while it is operating through the speed reduction apparatus, the ratio of speed reduction is increased to meet the added load and thereby more torque is transmitted to the driven shaft to overcome the load imposed, or when attempt is made to start a heavy load at rest the speed at which the motor will begin to assume the load is increased.

The operation of this transmission is as follows:

Assuming that the parts are in the position shown in Fig. 1, and that the motor shaft 12 is rotating at idling speed, the floating shaft 19 is in its rearward position under the influence of springs 134 and 135 and the rotative force of the engine is transmitted through frictional engagement of friction disc 36 with friction plate 42. Because, however, the speed of the engine is low, weights 47 and 48 are held at their inward position under the influence of springs 62 and 63 and accordingly variable eccentric 64 remains in its concentric position and rocker shafts 81, 82, 83 and 84 are motionless.

In order to start the car forward, the operator, through manual control mechanism 123, 124, first moves control ring 119 to its extreme forward position as shown in Figs. 1 and 11. This permits pawls 116 to engage with splines 117 of "forward drum" 86. At this time, however, since the rocker shafts are motionless, drum 86 is likewise motionless. In order to start the car, the engine is speeded up by opening the throttle. Upon the increase of speed of the friction plate 42 with weights 47, 48 secured thereto, the said weights begin to move outwardly, and as they do so they move variable eccentric 64 to a position of eccentricity with respect to the axis of shaft 17. At first this eccentricity will be very small and accordingly the ratio of speed reduction will be high. As soon as variable eccentric 64 has moved to a position of eccentricity the rocker shafts 81, 82, 83 and 84 will commence to rock and power will be delivered through the one-way clutches associated with drum 86 causing the drum 86 to rotate in the same direction as the engine. This rotation of drum 86 will be transmitted through pawls 116 to ring 109 and thus through pin 110 to shaft 17.

As the speed of the car and of the engine increase the weights 47 and 48 will move gradually farther and farther out, the reaction ring 187 meanwhile rotating slightly relative to the weights because of the angular relation of its slots 185, 186 to the bolt heads 183, 184 associated with said weights. As these weights move outwardly the ratio of speed reduction will be decreased continuously and smoothly, without intermediate breaks as in the case of the ordinary transmission where gears are shifted.

When the automobile has reached a predetermined speed, say 18 miles per hour, evidenced by a corresponding speed of rotation of shaft 17, weights 132, 133 will, under the influence of centrifugal force, overcome the resistance of springs 134, 135 and move outwardly upon their rods 130, 131. Through links 136, 137 collar 138 will then be moved forwardly and, because of the pin connection 139 between collar 138 and floating shaft 19, floating shaft 19 will be moved forwardly. Such forward motion of floating shaft 19 will produce two results: (a) ring 109 which is secured to floating shaft 19 by pin 110 will be moved forwardly to the position shown in Fig. 14, thus disengaging pawls 116 from splines 117; and (b) fingers 32, 33, 34 and 35 will be rocked forwardly about their pivots thus bringing proturbances 41 into engagement with friction disc 37 tending to move said friction disc forwardly into engagement with friction wheel 23 and, upon further movement, to move friction wheel 23 into frictional engagement with the surface of flywheel 11. Since friction wheel 23 is splinedly secured to floating shaft 19, and the latter through pins 110 and 139 is secured to rotate with shaft 17, a "direct" connection is thus established between engine shaft 12 and shaft 17 so that the two may rotate together. At the same time the engagement of friction disc 36 with friction plate 42 is terminated, and accordingly power is no longer transmitted to friction plate 42. Thus the speed reduction apparatus, comprising friction plate 42 and its associated weights, variable eccentric 64 and its associated bands, the rocker shafts and their associated clutches and the drums 85 and 86 are no longer operatively connected and may come to rest. The "direct" driving connection continues until the speed of the driven shaft falls below the speed at which springs 134, 135 are able to overcome the centrifugal force acting upon weights 132, 133 whereupon floating shaft 19 moves rearwardly to its original position and a connection between engine and driven shaft through the speed reduction apparatus is once more established.

If, as the car is gaining speed while the engine and driven shaft are connected through the speed reduction apparatus, the driver wishes to maintain this relationship above the predetermined speed (say 18 miles per hour) in which the relationship would automatically change to "direct" drive, he may prevent this change by manually tightening the brake band 150 whereby, through links 149, the weights 132, 133 are maintained at their inward position so that they do not move outwardly until the tightening of brake band 150 has been released.

In the event, while the engine is connected to the driven shaft through the speed reduction apparatus, there should be some heavy load upon the driven shaft, the surfaces 155, 171 of annular ring 154 and torque reaction member 156 will move relative to each other and the torque reaction member 156 will be separated from its normal seat. Such movement of torque reaction member 156 will be transmitted through linkage including rod 178 to tighten brake band 190 upon reaction ring 187 and thus, by reason of the angular relation between slots 185, 186 and the axis of movement of bolt heads 183, 184, already described, weights 47 and 48 will be moved inwardly thereby decreasing the eccentricity of the variable eccentric 64 and increasing the ratio of the speed reduction apparatus. If, for example, the car should be started on a hill, the means just described would operate to increase the ratio of engine speed to driven shaft speed and would thereby enable the engine to operate at higher relative speed to produce the necessary starting torque. Also, in the event of increase of load upon the driven shaft, sufficient to cause rearward movement of the torque reaction member, the weights 47, 48 would be restricted to an extent sufficient to reduce the eccentricity of the variable eccentric member 64 and thus permit increase of speed of the engine relative to the speed of the driven shaft in order to transmit greater torque to the driven shaft without substantial change of speed thereof, to overcome the added load.

Where the phrase "infinitely variable speed reducer" or equivalent form of expression is used herein, it is intended to refer to a mechanism such as that comprising the variable eccentric 64, the bands 67, 68, 69 and 70 which ride thereon, the rocker shafts 81, 82, 83 and 84 actuated thereby, and the one-way clutches associated therewith, which is adapted to transmit power from one shaft to another on a speed reduction basis and to be capable of adjustment so that the speed reduction may be varied to an infinite number of ratios within the available limits in contradistinction to a mechanism such as the standard automobile gear transmission wherein the speed reduction may be varied only between a limited number of fixed ratios corresponding to certain gear sizes.

I claim:

1. A variable speed transmission comprising, in combination, a drive shaft, a driven shaft, an over-running oscillatory clutch adapted to be connected in driving relation with the driven shaft, means associated with the driving shaft for oscillating said clutch including a member adapted to be rotated when said driving shaft rotates and to be moved from a position concentric with said driving shaft at which no power is transmitted between said shafts to a position eccentric with respect to said driving shaft at which power is transmitted between said shafts at reduced speed, centrifugal means responsive to rotation of the driving shaft to move said member toward eccentric position as the speed of said driving shaft increases, and centrifugal means responsive to rotation of the driven shaft for disconnecting the drive through said over-running clutch when the speed of rotation of the driven shaft exceeds a predetermined speed.

2. A variable speed transmission comprising, in combination, a drive shaft, a driven shaft, an over-running oscillatory clutch adapted to be connected in driving relation with the driven shaft, means associated with the driving shaft for oscillating said clutch including a member adapted to be rotated when said driving shaft rotates and to be moved from a position concentric with said driving shaft at which no power is transmitted between said shafts to a position eccentric with respect to said driving shaft at which power is transmitted between said shafts at reduced speed, centrifugal means responsive to rotation of the driving shaft to move said member toward eccentric position when the speed of said driving shaft has increased above a predetermined speed, and centrifugal means responsive to rotation of the driven shaft for disconnecting the drive through said over-running clutch when the speed of rotation of the driven shaft exceeds a predetermined speed.

3. A variable speed transmission comprising, in combination, a drive shaft, a driven shaft, an over-running oscillatory clutch adapted to be connected in driving relation with the driven shaft, means associated with the driving shaft for oscillating said clutch including a member adapted to be rotated when said driving shaft rotates and to be moved from a position concentric with said driving shaft at which no power is transmitted between said shafts to a position eccentric with respect to said driving shaft at which power is transmitted between said shafts at reduced speed, opposed resilient means and centrifugal means responsive to rotation of the driving shaft to move said member toward eccentric position when the speed of said driving shaft has increased above a predetermined speed and to return the same toward concentric position when said speed has fallen below said predetermined speed, and centrifugal means responsive to rotation of the driven shaft for disconnecting the drive through said over-running clutch when the speed of rotation of the driven shaft exceeds a predetermined speed.

4. In combination with a speed reduction apparatus, a driving shaft, a driven shaft, means under control of a weight adapted to be moved toward eccentric position under the influence of centrifugal force acting upon said weight in response to increase of speed of rotation of the driving shaft and by said movement tending to decrease the ratio of speed reduction between said shafts, and means responsive to increase of load upon the driven shaft tending to oppose said movement as the load upon said driven shaft increases above a predetermined amount.

5. In a device for transmitting power, in combination, driving, intermediate and driven shafts, variable speed reduction apparatus interposed between the driving shaft and said intermediate shaft, means responsive to the speed of rotation of said driving shaft for varying the ratio of speed reduction of said apparatus and adapted to tend to decrease said ratio as the speed of said driving shaft increases, a collar secured for rotation with the intermediate and the driven shafts and adapted to move axially with respect to one of said shafts when the load upon the driven shaft exceeds a predetermined amount, resilient means opposing axial movement of said collar, and linkage interconnecting said collar and said means responsive to the speed of rotation of the driving shaft adapted, upon axial movement of said collar to actuate said means in a direction tending to increase said ratio.

6. In combination with variable speed reduction apparatus, driving and driven shafts, a variable eccentric member adapted to be rotated when said driving shaft rotates, means for adjusting said member from a position concentric with said driving shaft to a position of predetermined maximum eccentricity for varying the ratio of speed reduction of said apparatus, centrifugal means responsive to the speed of rotation of said driving shaft tending to increase the eccentricity of said member as said speed increases, a collar secured for rotation with the driven shaft and adapted to move axially with respect thereto when the load upon the driven shaft exceeds a predetermined amount, resilient means opposing axial movement of said collar, and linkage interconnecting said collar and the means for adjusting said variable eccentric member whereby the eccentricity thereof is the resultant of the effect produced by said centrifugal means and axial movement of said collar.

7. In combination, a driving shaft, a driven shaft, a member adapted to rotate with one of said shafts and to be moved lengthwise thereof within a limited path of travel, means including said member adapted to interconnect the driving and driven shafts in direct relationship when said member is at one end of its path of travel, means comprising an infinitely variable speed reducer adapted to interconnect the driving and driven shafts in speed reduction relation when said member is at another position in its path of travel, and centrifugal means responsive to the speed of rotation of the driven shaft for moving said member from one of its said positions to the other.

8. In combination, a driving shaft, a driven shaft, a member adapted to rotate with one of said shafts and to be moved lengthwise thereof within a limited path of travel, means including said member adapted to interconnect the driving and driven shafts in direct relationship when said member is at one end of its path of travel, means comprising an infinitely variable speed reducer adapted to interconnect the driving and driven shafts in speed reduction relation when said member is at another position in its path of travel, and centrifugal means responsive to the speed of rotation of the driven shaft for moving said member from said second-mentioned position to said first-mentioned position as the speed of said driven shaft increases.

9. In combination, a driving shaft, a driven shaft, a member adapted to rotate with one of said shafts and to be moved lengthwise thereof within a limited path of travel, means including said member adapted to interconnect the driving and driven shafts in direct relationship when said member is at one end of its path of travel, means comprising an infinitely variable speed reducer adapted to interconnect the driving and driven shafts in speed reduction relation when said member is at another position in its path of travel, and centrifugal means responsive to the speed of rotation of the driven shaft for moving said member from said second-mentioned position to said first-mentioned position when the driven shaft rotates at a speed in excess of a predetermined speed.

10. In combination, a driving shaft, a driven shaft, a floating shaft adapted to move within a predetermined path of movement, means including said floating shaft adapted to interconnect the driving and driven shafts in direct driving relation when the floating shaft is in one position, means comprising an infinitely variable speed reducer adapted to interconnect the driving and driven shafts in speed reduction relation when the floating shaft is in another position, and centrifugal means responsive to the speed of rotation of the driven shaft for moving said floating shaft from one of said positions to the other.

11. In combination, a driving shaft, a driven shaft, a floating shaft adapted to move within a predetermined path of movement, means including said floating shaft adapted to interconnect the driving and driven shafts in direct driving relation when the floating shaft is in one position, means comprising an infinitely variable speed reducer adapted to interconnect the driving and driven shafts in speed reduction relation when the floating shaft is in another position, and centrifugal means responsive to the speed of rotation of the driven shaft for moving said floating shaft from said second-mentioned position to said first-mentioned position as the speed of said driven shaft increases.

12. In combination, a driving shaft, a driven shaft, a floating shaft adapted to move within a predetermined path of movement, means including said floating shaft adapted to interconnect the driving and driven shaft in direct driving relation when the floating shaft is in one position, means comprising an infinitely variable speed reducer adapted to interconnect the driving and driven shafts in speed reduction relation when the floating shaft is in another position, and centrifugal means responsive to the speed of rotation of the driven shaft for moving said floating shaft from said second-mentioned position to said first-mentioned position when the speed of said driven shaft has increased above a predetermined speed.

13. In combination, a driving shaft, a driven shaft, a floating shaft secured for rotation with one of said shafts and adapted to move relative to both of said shafts within a limited path of travel, means including said floating shaft adapted to interconnect the driving and driven shafts in direct driving relation when the floating shaft is in one position, means comprising an infinitely variable speed reducer adapted to interconnect the driving and driven shafts in speed reduction relation when the floating shaft is in another position, and centrifugal means responsive to the speed of rotation of the driven shaft for moving said floating shaft from one of said positions to the other.

14. In combination, a driving shaft, a driven shaft, a floating shaft secured for rotation with one of said shafts and adapted to move relative to both of said shafts within a limited path of travel, means including said floating shaft adapted to interconnect the driving and driven shafts in direct driving relation when the floating shaft is in one position, means comprising an infinitely variable speed reducer adapted to interconnect the driving and driven shafts in speed reduction relation when the floating shaft is in another position, and centrifugal means responsive to the speed of rotation of the driven shaft for moving said floating shaft from said second-mentioned position to said first-mentioned position as the speed of said driven shaft increases.

15. In combination, a driving shaft, a driven shaft, a floating shaft secured for rotation with one of said shafts and adapted to move relative to both of said shafts within a limited path of travel, means including said floating shaft adapted to interconnect the driving and driven shafts in direct driving relation when the floating shaft is in one position, means comprising an infinitely variable speed reducer adapted to interconnect the driving and driven shafts in speed reduction relation when the floating shaft is in another position, and centrifugal means responsive to the speed of rotation of the driven shaft for moving said floating shaft from said second-mentioned position to said first-mentioned position when the speed of said driven shaft has increased above a predetermined speed.

16. In combination, a driving shaft, a driven shaft, a floating shaft secured for rotation with one of said shafts and adapted to move relative to both of said shafts within a limited path of travel, a friction clutch interposed between said driving shaft and said floating shaft and adapted to secure said shafts for rotation together at the same speed when said floating shaft has moved to one position, an infinitely variable speed reduction power transmitting means adapted to be interposed between the driving and driven shafts when said floating shaft has moved to another position, and centrifugal means responsive to the speed of rotation of the driven shaft for moving said floating shaft from said second-mentioned position to said first-mentioned position as the speed of said driven shaft increases.

17. In combination, a driving shaft, a driven shaft, a floating shaft secured for rotation with one of said shafts and adapted to move relative to both of said shafts within a limited path of travel, a friction clutch interposed between said driving shaft and said floating shaft and adapted to secure said shafts for rotation together at the same speed when said floating shaft has moved to one position, an infinitely variable speed reduction power transmitting means adapted to be interposed between the driving and driven shafts when said floating shaft has moved to another position, and centrifugal means responsive to the speed of rotation of the driven shaft for moving said floating shaft from said second-mentioned position to said first-mentioned position when the speed of said driven shaft has increased above a predetermined speed.

18. In combination, driving and driven shafts, a member adapted to rotate with one of said shafts and to be moved lengthwise thereof within a limited path of travel, means including said member adapted to interconnect the driving and driven shafts in direct relationship when said member is at one end of its path of travel, means comprising an infinitely variable speed reducer adapted to interconnect the driving and driven shafts in speed reduction relation when said member is at another position in its path of travel, centrifugal means responsive to rotation of the driven shaft at a speed in excess of a predetermined speed tending to move said member from its second-mentioned position towards its first-mentioned position, and manual means for selectively opposing said movement whereby said driving and driven shafts may be selectively maintained in speed reduction relationship while the driven shaft rotates at a speed in excess of said predetermined speed.

19. In combination, a driving shaft, a driven shaft, a floating shaft secured for rotation with one of said shafts and adapted to move relative to both of said shafts within a limited path of travel, means including said floating shaft adapted to interconnect the driving and driven shafts in direct driving relation when the floating shaft is in one position, means comprising an infinitely variable speed reducer adapted to interconnect the driving and driven shafts in speed reduction relation when the floating shaft is in another position, centrifugal means responsive to the speed of rotation of the driven shaft for moving said floating shaft from said second-mentioned position to said first-mentioned position as the speed of said driven shaft increases and manual means for opposing said movement of said floating shaft whereby said driving and driven shafts may be selectively maintained in speed reduction relationship while the speed of said driven shaft increases.

20. In combination, a driving shaft, a driven shaft, a floating shaft secured for rotation with one of said shafts and adapted to move relative to both of said shafts within a limited path of travel, means including said floating shaft adapted to interconnect the driving and driven shafts in direct driving relation when the floating shaft is in one position, means comprising an infinitely variable speed reducer adapted to interconnect the driving and driven shafts in speed reduction relation when the floating shaft is in another position, centrifugal means responsive to the speed of rotation of the driven shaft for moving said floating shaft from said second-mentioned position to said first-mentioned position when the speed of said driven shaft has increased above a predetermined speed and manual means for opposing said movement of said floating shaft whereby said driving and driven shafts may be selectively maintained in speed reduction relationship while the driven shaft rotates at a speed in excess of said predetermined speed.

21. In combination, a driving shaft, a driven shaft, a floating shaft secured for rotation with one of said shafts and adapted to move relative to both of said shafts within a limited path of travel, a friction clutch interposed between said driving shaft and said floating shaft and adapted to secure said shafts for rotation together at the same speed when said floating shaft has moved to one position, an infinitely variable speed reduction power transmitting means adapted to be interposed between the driving and driven shafts when said floating shaft has moved to another position, centrifugal means responsive to the speed of rotation of the driven shaft for moving said floating shaft from said second-mentioned position to said first-mentioned position when the speed of said driven shaft has increased above a predetermined speed and manual means for opposing said movement of said floating shaft whereby said driving and driven shafts may be selectively maintained in speed reduction relationship while the driven shaft rotates at a speed in excess of said predetermined speed.

22. A variable speed transmission comprising in combination with a driving and a driven shaft, an infinitely variable speed reducer, means to adjust the ratio of speed reduction in said speed reducer, a weight member secured for rotation with the driving shaft and adapted to move under the influence of centrifugal force as the speed of rotation of said shaft increases, means interconnecting said weight member and said adjusting means whereby said movement of the weight member decreases the ratio of said speed reduction, and means interposed between said weight member and the driven shaft responsive to increase of load upon the driven shaft to oppose said movement of said weight member.

23. A variable speed transmission comprising in combination with driving and driven shafts, an over-running clutch adapted to be oscillated by a variable eccentric, a weight member secured for rotation with the driving shaft and adapted to move under the influence of centrifugal force away from the axis of said shaft as the speed thereof increases, means interconnecting said weight member and said variable eccentric whereby said movement increases the eccentricity of said variable eccentric, and means responsive to increase of load upon the driven shaft to oppose the said movement of said weight member.

24. A variable speed transmission comprising, in combination with driving and driven shafts, an infinitely variable speed reducer including a variable eccentric adapted to be moved to varying degrees of eccentricity whereby the speed reducer is adjusted to varying ratios of speed reduction, a weight member secured for rotation with the driving shaft and interconnected with said variable eccentric for moving said eccentric toward a position of greater eccentricity as the speed of said driving shaft increases and means responsive to increase of load upon the driven shaft to oppose the said movement of said weight member.

25. In combination with a speed reduction apparatus, a driving shaft, a driven shaft, means under control of a weight adapted to be moved toward eccentric position under the influence of centrifugal force acting upon said weight in response to increase of speed of rotation of one of said shafts and by said movement tending to decrease the ratio of speed reduction between said shafts, and means responsive to increase of load upon the driven shaft tending to oppose said movement as the load upon said driven shaft increases above a predetermined amount.

26. A variable speed transmission comprising in combination with a driving and a driven shaft, an infinitely variable speed reducer, means to adjust the ratio of speed reduction in said speed reducer, a weight member secured for rotation with the driving shaft and adapted to move under the influence of centrifugal force as the speed of rotation of said shaft increases, means interconnecting said weight member and said adjusting means whereby said movement of the weight member decreases the ratio of said speed reduction, and centrifugal means responsive to rotation of the driven shaft for disconnecting the drive through said speed reducer when the speed of rotation of the driven shaft exceeds a predetermined speed.

27. A variable speed transmission comprising, in combination, a drive shaft, a driven shaft, an over-running oscillatory clutch adapted to be connected in driving relation with the driven shaft, means associated with the driving shaft for oscillating said clutch including a member adapted to be rotated when said driving shaft rotates and to be moved toward a position of greater eccentricity with respect to said driving shaft whereby the amplitude of oscillation of said clutch is increased, centrifugal means responsive to rotation of the driving shaft to move said member toward a position of greater eccentricity as the speed of said driving shaft increases, and centrifugal means responsive to rotation of the driven shaft for disconnecting the drive through said over-running clutch when the speed of rotation of the driven shaft exceeds a predetermined speed.

28. In combination with a speed reduction apparatus, a driving shaft, a driven shaft, means under control of a weight adapted to be moved under the influence of centrifugal force acting upon said weight in response to increase of speed of rotation of the driving shaft and by said movement tending to decrease the ratio of speed reduction between said shafts, and means responsive to increase of load upon the driven shaft tending at any speed of rotation of the driving shaft to oppose said movement when the load upon said driven shaft has increased above a predetermined amount.

29. In a device for transmitting power, in combination, driving, intermediate and driven shafts, speed reduction apparatus interposed between the driving shaft and said intermediate shaft, means responsive to the speed of rotation of said driving shaft for changing the ratio of speed reduction and adapted to bring about a decrease in said ratio as the speed of said driving shaft increases, a collar secured for rotation with the intermediate and the driven shafts and adapted to move axially with respect to one of said shafts and angularly with respect to the radius of the other when the load upon the driven shaft exceeds a predetermined amount, resilient means opposing said movement of said collar, and linkage interconnecting said collar and said means responsive to the speed of rotation of the driving shaft adapted, upon said movement of said collar, to actuate said means in a direction tending to increase said ratio.

WILLIAM C. BRADEN.